United States Patent
Yarde et al.

(10) Patent No.: US 9,872,126 B2
(45) Date of Patent: Jan. 16, 2018

(54) SYSTEM AND METHOD OF CONFIGURING HVAC COMPONENTS IN AN HVAC SYSTEM

(71) Applicant: Carrier Corporation, Farmington, CT (US)

(72) Inventors: Bryan M. Yarde, Fort Wayne, IN (US); Michael A. Roher, Fort Wayne, IN (US)

(73) Assignee: Carrier Corporation, Jupiter, FL (US)

( * ) Notice: Subject to any disclaimer, the term of this patent is extended or adjusted under 35 U.S.C. 154(b) by 600 days.

(21) Appl. No.: 14/513,993

(22) Filed: Oct. 14, 2014

(65) Prior Publication Data

US 2015/0120063 A1    Apr. 30, 2015

Related U.S. Application Data

(60) Provisional application No. 61/896,427, filed on Oct. 28, 2013.

(51) Int. Cl.
| | |
|---|---|
| G05B 21/00 | (2006.01) |
| H04W 4/00 | (2009.01) |
| F24F 11/00 | (2006.01) |
| G05B 19/042 | (2006.01) |

(52) U.S. Cl.
CPC .......... *H04W 4/008* (2013.01); *F24F 11/006* (2013.01); *G05B 19/042* (2013.01); *F24F 2011/0067* (2013.01); *G05B 2219/21079* (2013.01); *G05B 2219/2614* (2013.01); *G05B 2219/31197* (2013.01)

(58) Field of Classification Search
CPC .................................................... H04W 4/008
USPC .................................................. 700/275–306
See application file for complete search history.

(56) References Cited

U.S. PATENT DOCUMENTS

| | | | |
|---|---|---|---|
| 8,849,301 B2 * | 9/2014 | Husney | H04W 4/02 455/456.1 |
| 2006/0099911 A1 | 5/2006 | Shibuya | |
| 2010/0081375 A1 | 4/2010 | Rosenblatt et al. | |
| 2010/0271177 A1 | 10/2010 | Pang et al. | |
| 2011/0007665 A1 * | 1/2011 | Dinur | H04L 41/0806 370/254 |
| 2011/0070828 A1 | 3/2011 | Griffin et al. | |

(Continued)

FOREIGN PATENT DOCUMENTS

WO    2010148832 A1    12/2010

OTHER PUBLICATIONS

Hutzel, William J. "A remotely accessed HVAC laboratory for distance education." International Journal of Engineering Education 18.6 (2002): pp. 711-716.*

(Continued)

*Primary Examiner* — Satish Rampuria
(74) *Attorney, Agent, or Firm* — Ice Miller LLP

(57) ABSTRACT

A system and method of configuring HVAC components in an HVAC system including a main system controller in operable communication with at least one auxiliary controller, wherein the main system controller and each of the at least one auxiliary controllers include a near field communication interface. The HVAC system components are configured by placing each of the at least one auxiliary controllers in close proximity to the main system controller, and operating the main system controller to initiate a pairing event.

17 Claims, 2 Drawing Sheets

(56) References Cited

U.S. PATENT DOCUMENTS

| | | |
|---|---|---|
| 2011/0291971 A1 | 12/2011 | Masaki et al. |
| 2012/0062360 A1 | 3/2012 | Wendt |
| 2012/0191257 A1* | 7/2012 | Corcoran ............ H04L 12/2818 |
| | | 700/278 |
| 2012/0315848 A1* | 12/2012 | Smith ...................... H04B 5/02 |
| | | 455/41.1 |
| 2013/0026947 A1 | 1/2013 | Economy et al. |
| 2013/0052946 A1 | 2/2013 | Chatterjee et al. |
| 2013/0086245 A1* | 4/2013 | Lu .......................... G05B 13/02 |
| | | 709/223 |
| 2013/0109404 A1 | 5/2013 | Husney |
| 2013/0141223 A1 | 6/2013 | Brandsma et al. |
| 2013/0149962 A1 | 6/2013 | Kim et al. |
| 2013/0176106 A1 | 7/2013 | Schultz et al. |
| 2013/0214609 A1 | 8/2013 | Carmen, Jr. |

OTHER PUBLICATIONS

Huang, Hsiao-Yi, et al. "Development of an intelligent energy management network for building automation." IEEE Transactions on Automation Science and Engineering 1.1 (2004): pp. 14-25.*
Sultan, Sana, Tehmina Khan, and Sairah Khatoon. "Implementation of hvac system through wireless sensor network." Communication Software and Networks, 2010. ICCSN'10. Second International Conference on. IEEE, 2010.pp. 52-56.*

* cited by examiner

SYSTEM AND METHOD OF CONFIGURING HVAC COMPONENTS IN AN HVAC SYSTEM

CROSS REFERENCE TO RELATED APPLICATIONS

The present application is related to, and claims the priority benefit of, U.S. Provisional Patent Application Ser. No. 61/896,427 filed Oct. 28, 2013, the contents of which are hereby incorporated in their entirety into the present disclosure.

TECHNICAL FIELD OF THE DISCLOSED EMBODIMENTS

The presently disclosed embodiments generally relate to heating, ventilation, and air-conditioning (HVAC) systems, and more particularly, to a system and method of configuring HVAC components in an HVAC system.

BACKGROUND OF THE DISCLOSED EMBODIMENTS

Some HVAC systems may contain several components, each having a separate control. These controls need to be associated properly to the local system configuration to operate properly because each of the controls may communicate on the same bus. Generally, this requires that each of the controls have a mechanism in which to be distinguishable from the other controls within the system. Generally, this is done by an installer manually selecting an identifier (e.g. address or name) through hardware or software associated with each control. This manual method increases the probability of mistakes during installation; thus, increasing the likelihood of the HVAC system not operating properly. There is, therefore, a need for a system and method to reduce the likelihood of mistakes during the installation process of an HVAC system.

SUMMARY OF THE DISCLOSED EMBODIMENTS

In one aspect, an HVAC system is provided. The HVAC system includes a main system controller operably coupled to a power supply source. The HVAC system further includes at least one auxiliary controller in operable communication with the main system controller. In one embodiment, each of the at least one auxiliary controllers may be in electrical communication with the main system controller. In one embodiment the electrical communication between the main system controller and each of the at least one auxiliary controllers may be wired or wireless.

In one embodiment, the main system controller includes a processor, a memory, and a near field communication interface. In one embodiment, each of the at least one auxiliary controllers include a processor, a memory, and a near field communication interface. In one embodiment, the main system controller includes a display screen.

In one aspect, a method of configuring and operating components within an HVAC system including a main system controller in operable communication with at least one auxiliary controller, wherein the main system controller and each of the at least one auxiliary controllers include a near field communication interface is provided. The method includes the step of supplying power to the main system controller.

In one embodiment, the method includes the step of placing the at least one auxiliary controller in close proximity to the main system controller. In one embodiment, the method includes step of operating the main system controller to initiate a pairing event. In one embodiment, the pairing event includes an exchange of data between the main system controller and each of the at least one auxiliary controllers. In one embodiment, the exchange of data includes assigning a unique identifier. In one embodiment, the method further includes the step of storing the respective unique identifier within each of the at least one auxiliary controllers. In one embodiment, the method further includes the step of operating the main system controller and each of the at least one auxiliary controllers based on the assigned unique identifiers.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
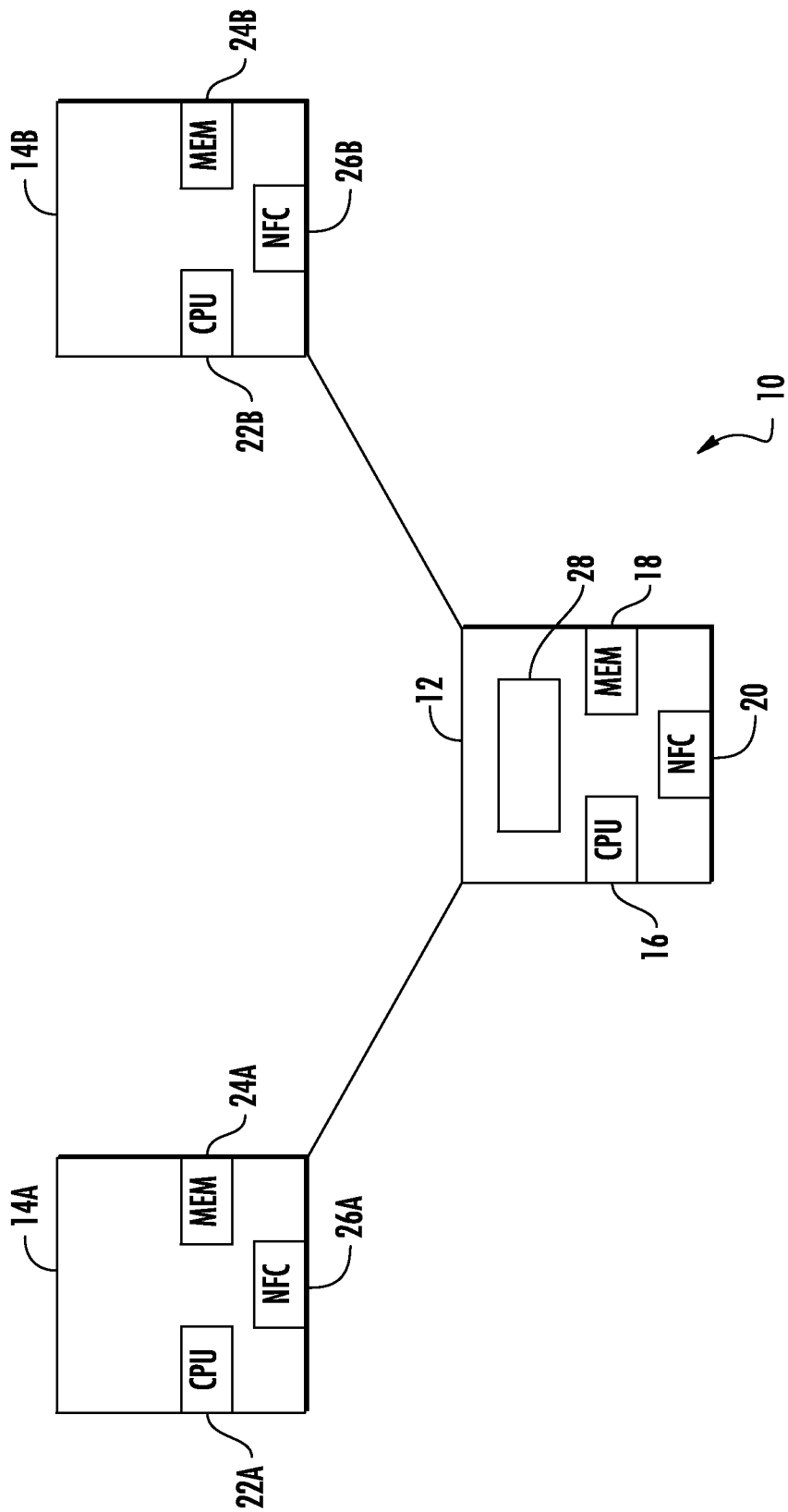
FIG. 1 is a schematic component diagram of an HVAC system according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates an HVAC system in one embodiment, generally referenced at 10. The HVAC system 10 includes a main system controller 12 operably coupled to a power supply source (not shown). It will be appreciated that the main system controller 12 may include a computer, thermostat, indoor unit control board, outdoor unit control board, etc. to name a few non-limiting examples. The HVAC system 10 further includes at least one auxiliary controller 14 in operable communication with the main system controller 12. It will be appreciated that the at least one auxiliary controller 14 may include thermostats, dampers, indoor unit control boards, outdoor unit control boards, etc. to name a few non-limiting examples. In one embodiment, each of the at least one auxiliary controllers 14 may be in electrical communication with the main system controller 12. In one embodiment the electrical communication between the main system controller 12 and each of the at least one auxiliary controllers 14 may be wired or wireless. For example, after each of the at least one auxiliary controllers 14 is configured by the method described herein, each of the at least one auxiliary controllers 14 are installed in electrical communication to operate the HVAC system 10.

In one embodiment, the main system controller 12 includes a processor 16, a memory 18, for example read only memory (ROM) and electrically erasable programmable read only memory (EEPROM) to name two non-limiting examples, and a near field communication interface 20. In one embodiment, each of the at least one auxiliary controllers 14 include a processor 22, a memory 24, for example read only memory (ROM) and electrically erasable programmable read only memory (EEPROM) to name two non-limiting examples, and a near field communication interface 26. The near field communication interfaces 20 and 26 allows a form of contactless communication between the main system controller 12 and each of the at least one auxiliary controllers 14. The main system controller 12 and each of the at least one auxiliary controllers 14 further include software stored within the memory 22 and 24 respectively, for the execution thereof by the processors 16 and 22 respectively. In one embodiment, the main system controller 12 includes a display screen 28, for example a liquid crystal display (LCD) to name one non-limiting example.

Figure 2:
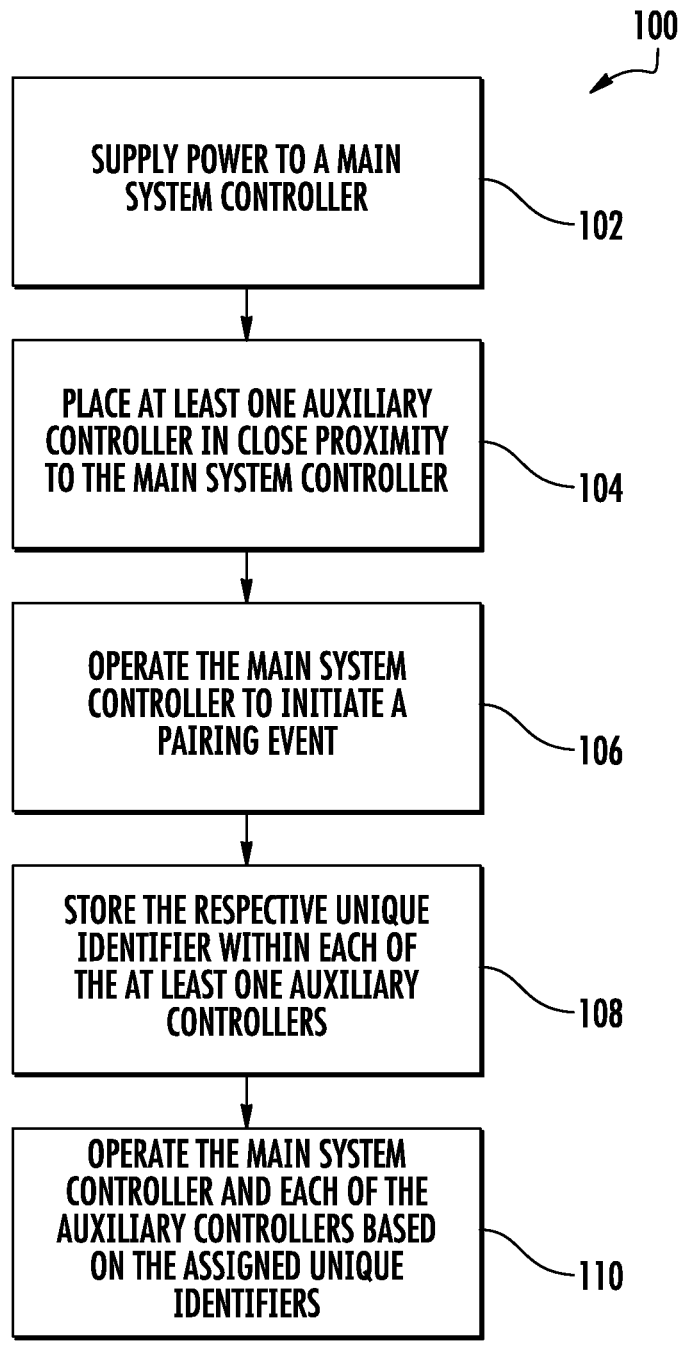
FIG. 2 is a schematic flow diagram of a method for configuring and operating HVAC components within an HVAC system.

FIG. 2 illustrates a schematic flow diagram of an exemplary method 100 of configuring and operating components within the HVAC system 10. The method 100 includes the step 102 of supplying power to the main system controller 12. Generally, power supplied to the main system controller 12 may be 24VAC, to name one non-limiting example.

In one embodiment, the method 100 includes step 104 of placing the at least one auxiliary controller 14 in close proximity to the main system controller 12. For example, to begin configuration of each of the at least one auxiliary controllers 14, a user or installer may place the least one auxiliary controllers 14 within a distance close enough to communicate with the main system controller 12. As the least one auxiliary controllers 14 moves within close proximity of the main system controllers 12, the near field communication interfaces 20 and 24 may begin communication between the main system controller 12 and each of the auxiliary controllers 14.

In one embodiment, the method 100 includes step 106 of operating the main system controller 12 to initiate a pairing event. In one embodiment, the pairing event includes an exchange of data between the main system controller 12 and each of the at least one auxiliary controllers 14. In one embodiment, the exchange of data includes assigning a unique identifier to each of the auxiliary controllers 14. For example, as auxiliary controller 14A is placed in close proximity to the main controller 12, the processor 16 executes software stored in memory 18 to assign a unique identifier, e.g. 0001 to name one non-limiting example, for auxiliary controller 14A. The unique identifier may be communicated from the near field communication interface 20, of the main system controller 12, to the near field communication interface 26A.

In one embodiment, the method 100 further includes the step 108 of storing the respective unique identifier within each of the at least one auxiliary controllers 14. For example, the unique identifier may then be stored within the memory 24A of the auxiliary controller 14A. As another auxiliary controller 14, for example auxiliary controller 14B, is place in close proximity to the main controller 12, it may be assigned a different unique identifier by the main system controller 12, e.g. 0010 to name one non-limiting example. The unique identifier may be communicated from the near field communication interface 20, of the main system controller 12, to the near field communication interface 26B. The unique identifier may then be stored within the memory 24B auxiliary controller 14B.

In one embodiment, the method 100 further includes step 110 of operating the main system controller 12 and each of the at least one auxiliary controllers 14 based on the assigned unique identifiers. For example, auxiliary controller 14A may be a zone control thermostat placed within an area designated as Zone 1, and auxiliary controller 14B may be a zone control thermostat placed within an area designated as Zone 2. If auxiliary controller 14A receives a demand to heat or cool the space within Zone 1, auxiliary zone controller 14A may send a signal to the main system controller 12. The main system controller 12 may recognize the signal being sent from unique identifier 0001 as assigned to auxiliary controller 14A in step 106. The main system controller 12 may determine the appropriate action of the HVAC system 10 in order to satisfy the demand within Zone 1. It will be appreciated that any number of auxiliary controllers 14 may send signals, designating any number of commands, to the main controller 12.

It will therefore be appreciated that each of the auxiliary controllers 14 may be configured using near field communication, by placing each of the at least one auxiliary controllers 14 within close proximity to the main system controller 12. Because the main system controller 12 executes software instructions to assign unique identifiers to each auxiliary controller 14 with which it establishes a communication link, the system 10 is assured that each controller will have a unique identifier that is known to the main system controller 12.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method of configuring and operating components within a heating, ventilation, and air conditioning (HVAC) system including a main system controller in communication with one or more auxiliary controllers, wherein the main system controller and each of the one or more auxiliary controllers include a near field communication interface, the method comprising the steps of:
   initiating, by the main system controller and in response to a determination that each of the or more auxiliary controllers is in proximate range to the main system controller, a pairing event with each of the one or more auxiliary controllers;
   assigning, by the main system controller and subsequent to having successfully paired with the one or more auxiliary controllers, a unique identifier to each of the one or more auxiliary controllers;
   receiving, by the main system controller, a signal from a paired auxiliary controller of the one or more auxiliary controllers, wherein the signal is indicative of a demand to heat or cool detected by the paired auxiliary controller, and wherein the signal includes a unique identifier of the paired auxiliary controller and an HVAC control command corresponding to the condition detected by the paired auxiliary controller; and
   performing, by the main system controller, an action on the HVAC system based on the HVAC control command received with the signal from the paired auxiliary controller.

2. The method of claim 1, wherein the pairing event includes an exchange of data between the main system controller and each of the one or more auxiliary controllers using the near field communication interfaces.

3. The method of claim 1, wherein assigning the unique identifier to each of the one or more auxiliary controller includes transmitting the respective unique identifier to each of the one or more auxiliary controller to which the respective unique identifier has been assigned.

4. The method of claim 1, wherein the paired auxiliary controller is associated with a designated zone, and wherein performing the action on the HVAC system comprises performing the action on a portion of the HVAC system corresponding to the designated zone.

5. The method of claim 1, wherein the paired auxiliary controller includes at least one of a thermostat, a damper, an indoor unit control board, and an outdoor unit control board.

6. The method of claim 1, wherein receiving the signal from the paired auxiliary controller comprises receiving the signal via one of a wired electrical communication path or a wireless electrical communication path.

7. The method of claim 1, wherein initiating the pairing event with each of the one or more auxiliary controllers comprises initiating the paring event by a near field communication interface of the main system controller.

8. The method of claim 7, wherein receiving signal from the paired auxiliary controller comprises receiving the signal via an electrical communication path that is not managed by the near field communication interface.

9. A heating, ventilation, and air conditioning (HVAC) system comprising:
a main system controller; and
one or more auxiliary controllers in communication with the main system controller;
wherein the main system controller and each of the one or more auxiliary controllers includes a near field communication interface; and
wherein the main system controller:
  initiates, by the near field communication interface of the main system controller and in response to a determination that each of the or more auxiliary controllers is in proximate range to the main system controller, a pairing event with each of the one or more auxiliary controllers;
  assigns, subsequent to having successfully paired with the one or more auxiliary controllers, a unique identifier to each of the one or more auxiliary controllers;
  receives a signal from a paired auxiliary controller of the one or more auxiliary controllers, wherein the signal is indicative of a demand to heat or cool detected by the paired auxiliary controller, and wherein the signal includes the unique identifier of the paired auxiliary controller and an HVAC control command corresponding to the condition detected by the paired auxiliary controller; and
  performs an action on the HVAC system based on the HVAC control command received with the signal from the paired auxiliary controller.

10. The HVAC system of claim 9, wherein the pairing event includes an exchange of data between the main system controller and each of the one or more auxiliary controllers using the near field communication interfaces.

11. The HVAC system of claim 9, wherein each of the one or more auxiliary controllers are configured to:
receive, by the near field communication interface of the respective one of the auxiliary controllers during the pairing event, the unique identifier assigned to the respective one of the auxiliary controllers by the main system controller;
receive a demand to one of heat or cool an area associated with the respective one of the auxiliary controllers; and
transmit, subsequent to having successfully paired with the main system controller, a signal to the main system controller, wherein the signal is indicative of the received demand, and wherein the signal includes the received unique identifier.

12. The HVAC system of claim 9, wherein to assign the unique identifier to each of the at least one auxiliary controller includes to transmit the respective unique identifier to each of the at least one auxiliary controller to which the respective unique identifier has been assigned.

13. The HVAC system of claim 9, wherein the paired auxiliary controller is associated with a designated zone, and wherein to perform the action on the HVAC system comprises to perform the action on a portion of the HVAC system corresponding to the designated zone.

14. The HVAC system of claim 9, wherein the paired auxiliary controller includes at least one of a thermostat, a damper, an indoor unit control board, and an outdoor unit control board.

15. The HVAC system of claim 9, wherein to receive the signal from the paired auxiliary controller comprises to receive the signal via one of a wired electrical communication path or a wireless electrical communication path.

16. The HVAC system of claim 9, wherein to initiate the pairing event with each of the one or more auxiliary controllers comprises to initiate the paring event by a near field communication interface of the main system controller.

17. The HVAC system of claim 16, wherein to receive signal from the paired auxiliary controller comprises to receive the signal via an electrical communication path that is not managed by the near field communication interface.

* * * * *